(12) United States Patent
Maben (10) Patent No.: US 12,049,323 B2
(45) Date of Patent: Jul. 30, 2024

(54) AIR DISTRIBUTION SYSTEM FOR USE IN AN AIRCRAFT

(71) Applicant: The Boeing Company, Chicago, IL (US)

(72) Inventor: Douglas Dean Maben, Seattle, WA (US)

(73) Assignee: The Boeing Company, Arlington, VA (US)

( * ) Notice: Subject to any disclaimer, the term of this patent is extended or adjusted under 35 U.S.C. 154(b) by 155 days.

(21) Appl. No.: 17/368,137

(22) Filed: Jul. 6, 2021

(65) Prior Publication Data

US 2022/0024594 A1     Jan. 27, 2022

Related U.S. Application Data

(60) Provisional application No. 63/055,455, filed on Jul. 23, 2020.

(51) Int. Cl.
*B64D 11/00* (2006.01)
*B64D 13/02* (2006.01)
*B64D 13/00* (2006.01)

(52) U.S. Cl.
CPC ............ *B64D 13/02* (2013.01); *B64D 11/003* (2013.01); *B64D 2013/003* (2013.01)

(58) Field of Classification Search
CPC .............................. B64D 11/003; B64D 13/02; B64D 2013/003; B64D 13/06; B64D 13/08; B64D 2013/0625; B64D 13/00

(Continued)

(56) References Cited

U.S. PATENT DOCUMENTS 3,687,054 A * 8/1972 Boberg .................. B64D 13/00
454/76
4,742,760 A * 5/1988 Horstman .............. B64D 13/00
454/76

(Continued)

FOREIGN PATENT DOCUMENTS

DE    102008026093 B4    2/2014
EP        2851298 B1    12/2017
(Continued)

OTHER PUBLICATIONS

Zhang, Tengfei et al., Novel air distribution system for commercial aircraft cabins, Building and Environment, 2007, pp. 1675-1684, vol. 42 No. 4.

(Continued)

*Primary Examiner* — Ko-Wei Lin
(74) *Attorney, Agent, or Firm* — Alleman Hall & Tuttle LLP (57) ABSTRACT

An aircraft including a fuselage having a side wall at least partially defining a passenger cabin and a crown section of the aircraft. The passenger cabin includes an overhead zone, a passenger zone, and a floor zone. An air supply duct is positioned within the crown section, and the air supply duct is configured to pressurize the crown section with air. At least one return air outlet is defined in the floor zone. An interior structure is coupled to the side wall and extends between the passenger cabin and the crown section. The interior structure includes a plurality of nozzles oriented to discharge the pressurized air from the crown section along an airflow path that extends downward through the overhead zone, downward through the passenger zone, and then towards the at least one return air outlet.

20 Claims, 5 Drawing Sheets

(58) Field of Classification Search
USPC .......................................................... 454/76
See application file for complete search history.

(56) References Cited

U.S. PATENT DOCUMENTS

| | | | | |
|---|---|---|---|---|
| 5,695,396 A * | 12/1997 | Markwart | ............... | B64D 13/00 |
| | | | | 454/71 |
| 6,413,159 B1 * | 7/2002 | Bates, III | ............... | B64D 13/00 |
| | | | | 454/301 |
| 8,328,607 B2 * | 12/2012 | Reisbach | ............... | B64D 13/00 |
| | | | | 454/71 |
| 9,581,163 B2 * | 2/2017 | Rivera | ...................... | F04D 3/00 |
| 10,081,429 B2 * | 9/2018 | Trudeau | ................... | F15D 1/006 |
| 11,548,647 B2 * | 1/2023 | Hirotsu | ................... | F24F 13/02 |
| 2007/0111650 A1 * | 5/2007 | Lerche | ................... | B64D 13/06 |
| | | | | 454/75 |
| 2007/0164158 A1 * | 7/2007 | Buchholz | ................. | B64C 1/18 |
| | | | | 244/119 |
| 2009/0061754 A1 * | 3/2009 | Hlavka | ................. | B64D 13/00 |
| | | | | 454/152 |
| 2009/0311951 A1 * | 12/2009 | Walkinshaw | ........... | F24F 13/26 |
| | | | | 96/60 |
| 2012/0040599 A1 * | 2/2012 | Hesselbach | ............ | B64D 11/00 |
| | | | | 454/143 |
| 2013/0327891 A1 | 12/2013 | Zhang et al. | | |
| 2015/0063995 A1 * | 3/2015 | Rivera | ................... | B64D 13/06 |
| | | | | 415/207 |
| 2016/0318614 A1 * | 11/2016 | Bultemeier | ............. | F24F 13/06 |
| 2018/0105275 A1 * | 4/2018 | Lynch | .................... | B64D 13/06 |
| 2018/0362164 A1 * | 12/2018 | Metten | ................. | B64D 11/064 |
| 2020/0148367 A1 * | 5/2020 | Vandyke | ................ | B64D 13/06 |
| 2020/0231287 A1 * | 7/2020 | Hirotsu | .................. | B64D 13/06 |
| 2020/0231290 A1 * | 7/2020 | Dickson | ................. | B64D 13/08 |
| 2020/0248933 A1 * | 8/2020 | Mackin | .................. | B64D 13/08 |
| 2020/0385129 A1 * | 12/2020 | Wang | ..................... | B64D 13/00 |

FOREIGN PATENT DOCUMENTS

| | | |
|---|---|---|
| EP | 3925885 A1 | 12/2021 |
| EP | 3960629 A1 | 3/2022 |

OTHER PUBLICATIONS

Extended European Search Report and Written Opinion issued in European Application No. 21185438.5 dated Dec. 15, 2021, pp. 13.
European Patent Office, Office Action Issued in Application No. 21185438.5, Mar. 20, 2024, Germany, 8 pages.

* cited by examiner

AIR DISTRIBUTION SYSTEM FOR USE IN AN AIRCRAFT

CROSS-REFERENCE TO RELATED APPLICATION

This application claims priority to U.S. Application Ser. No. 63/055,455, filed Jul. 23, 2020, and entitled AIR DISTRIBUTION SYSTEM FOR USE IN AN AIRCRAFT, which is hereby incorporated by reference in its entirety.

FIELD

The field relates generally to environmental control systems for use in confined spaces designed for human occupancy and, more specifically, to air distribution systems that facilitate minimizing airflow between passengers within confined spaces, such as aircraft passenger cabins.

BACKGROUND

Some known pressurized aircraft use Environmental Control Systems ("ECS") to maintain cabin pressurization and to control cabin temperatures during flight. The ECS generally channels external air from the engines towards the aircraft cabin to pressurize the cabin. Some known systems condition the air using air conditioning packs, and the conditioned air is distributed within the cabin via an air distribution system. Some air distribution systems include multiple discrete nozzles located on either side of the interior of the aircraft fuselage above the passengers. The nozzles discharge conditioned air therefrom to generate two opposing and counter-rotating "cells" of air that circulate across the passenger seats before exiting the cabin through a return air grille located at the floor of the cabin. However, generating the counter-rotating cells requires the air to be discharged at relatively high velocities, which can generate undesirable noise pollution within the cabin. In addition, the counter-rotating cells may cause cross-circulation to occur between passengers, which is a significant consideration in view of recent global health crises.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is an aircraft including a side wall at least partially defining a passenger cabin and a crown section of the aircraft. The passenger cabin includes an overhead zone, a passenger zone, and a floor zone. An air supply duct is positioned within the crown section, and the air supply duct is configured to pressurize the crown section with air. At least one return air outlet is defined in the floor zone. An interior structure is coupled to the side wall and extends between the passenger cabin and the crown section. The interior structure includes a plurality of nozzles oriented to discharge the pressurized air from the crown section along an airflow path that extends downward through the overhead zone, downward through the passenger zone, and then towards the at least one return air outlet.

Another aspect is an aircraft including a side wall at least partially defining a passenger cabin and a crown section of the aircraft. The passenger cabin includes an overhead zone, a passenger zone, and a floor zone. An air supply duct is positioned within the crown section, and the air supply duct is configured to channel air therethrough. At least one return air outlet is defined in the floor zone. A plurality of interior panels extend between the passenger cabin and the crown section, and each interior panel is coupled in flow communication with the air supply duct. The plurality of interior panels each include a plurality of perforations configured to discharge the air therefrom along an airflow path that extends downward through the overhead zone, downward through the passenger zone, and then towards the at least one return air outlet.

Yet another aspect is an air distribution system including an air supply duct configured to channel air therethrough. A plurality of interior panels are each coupled in flow communication with the air supply duct, and the plurality of interior panels are coupled to each other in an array to define an interior structure. Each interior panel includes a housing having a side wall defining an air inlet and an air outlet. A porous support structure is coupled to the side wall at the air outlet. An air plenum is defined between the air inlet and a first side of the porous support structure, and a plurality of perforations configured to discharge the air therefrom are defined on a second side of the porous support structure.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Examples described below include air distribution systems that facilitate minimizing airflow between passengers within confined spaces, such as aircraft passenger cabins. Example systems described provide a displacement ventilation scheme that generates bulk downward airflow within the confined space. In one example, the bulk downward airflow is discharged from above seated passengers in the confined space, downward past the passengers, and towards an outlet located at the floor of the confined space. This directional bulk downward airflow facilitates limiting cross-circulation between passengers seated next to each other in a respective row of an aircraft, for example. Example systems facilitate reducing the spread of airborne contaminants between nearby occupants, reducing noise and undesirable drafts, and limiting the formation of stagnant zones of circulation within the confined space.

Figure 1:
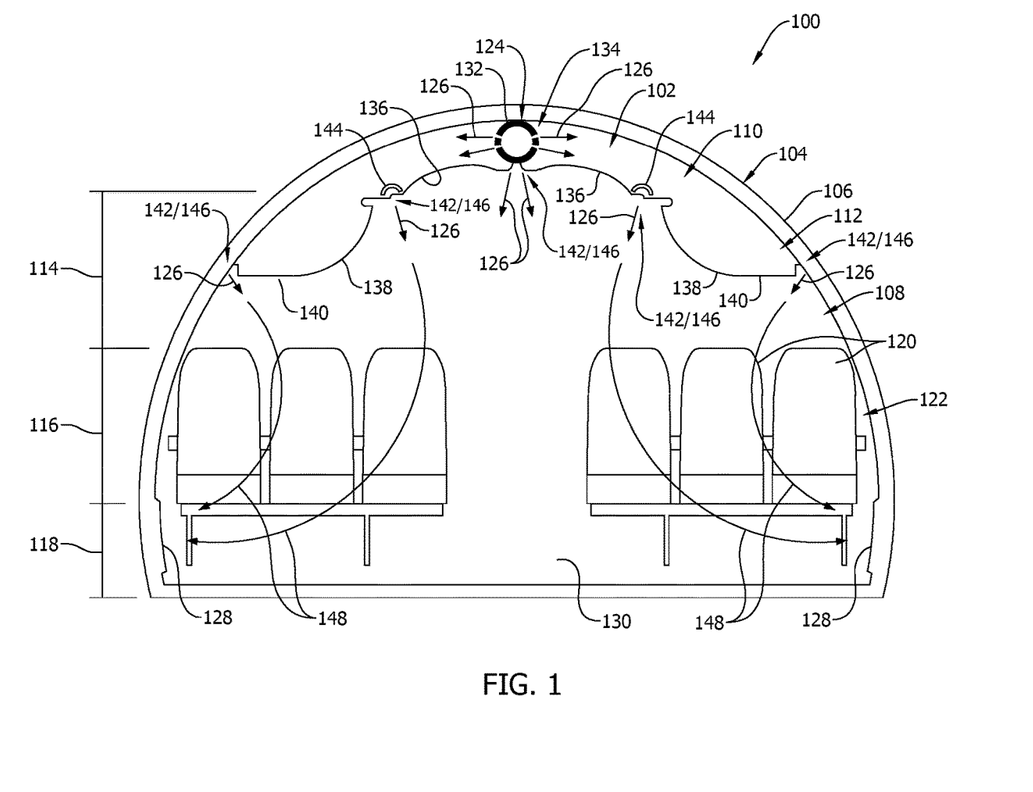
FIG. 1 is a cross-sectional view of an aircraft having an example air distribution system therein.

FIG. 1 is a cross-sectional view of an aircraft 100 having an example air distribution system 102 therein. Aircraft 100 includes a fuselage 104 having a side wall 106 that at least partially defines a passenger cabin 108 and a crown section 110 of aircraft 100. Crown section 110 is positioned above passenger cabin 108, and an interior structure 112 coupled to side wall 106 extends between crown section 110 and passenger cabin 108. Passenger cabin 108 includes an overhead zone 114, a passenger zone 116, and a floor zone 118. Passenger zone 116 includes a plurality of seats 120 designed for human occupancy. Seats 120 are arranged in one or more rows 122 across passenger cabin 108. Overhead zone 114 is located above passenger seats 120, and floor zone 118 is located below passenger seats 120.

Air distribution system 102 includes an air supply duct 124 positioned within crown section 110. In one example, interior structure 112 is arranged such that crown section 110 defines an open volume between side wall 106 and interior structure 112. Air supply duct 124 is configured to channel conditioned air 126 therethrough, which is received from an environment control system (not shown) of aircraft 100. Air supply duct 124 is configured to discharge the conditioned air 126 within the crown section 110 to pressurize crown section 110 with conditioned air 126. Pressurizing crown section 110 with conditioned air 126 facilitates supplying passenger cabin 108 with conditioned air 126. For example, at least one return air outlet 128 is defined in floor zone 118 and, as will be described in more detail below, conditioned air 126 discharged from crown section 110 is channeled through passenger cabin 108 and then exhausted from passenger cabin 108 through return air outlet 128. Referring to FIG. 1, return air outlet 128 is a return air grille defined in side wall 106 of fuselage. Alternatively, an air exhaust port may be defined in a floor 130 of passenger cabin 108.

Referring to FIG. 1, air supply duct 124 includes a side wall 132 having a plurality of airflow openings 134 defined therein. Airflow openings 134 provide flow communication from air supply duct 124 to crown section 110 to facilitate pressurization thereof. Airflow openings 134 may be any size and/or shape that enables air distribution system 102 to function as described herein. For example, airflow openings 134 may be defined by multiple discrete holes or cutouts within side wall 106 spaced along a length of air supply duct 124 and fuselage 104. In an alternative example, air supply duct 124 is a piccolo type supply duct.

Interior structure 112 is formed from a plurality of components, such as interior panels 136, stowage bins 138, overhead consoles 140, and the like. In one example, at least some of components are spaced from each other to define gaps 142 therebetween. For example, interior panels 136, stowage bins 138, and overhead consoles 140 may be coupled to each other, but also spaced from each other to provide airflow communication between crown section 110 and passenger cabin 108 through gaps 142. In such an example, a blocking member 144 may extend across at least one of the plurality of gaps 142. Blocking member 144 is adapted to restrict visibility into crown section 110 from passenger cabin 108 while still permitting airflow communication therebetween. Components, such as overhead consoles 140, may also be spaced from side wall 106 to define additional gaps 142.

Accordingly, gaps 142 define a plurality of nozzles 146 within interior structure 112. In an alternative example, the components themselves include airflow openings (not shown) defined therein to define nozzles 146 of interior structure 112. For example, gaps may be hidden behind light valences or other interior features to define additional nozzles 146 within interior structure 112. Nozzles 146 are designed to discharge conditioned air 126 therefrom in a substantially downward direction relative to crown section 110. Referring to FIG. 1, conditioned air 126 travels along an airflow path 148 that extends downward through overhead zone 114, downward through passenger zone 116, and then towards return air outlet 128 located in floor zone 118. As a result of a combination of factors, such as airflow discharge velocity, discharge directionality of conditioned air 126, and/or a pressure differential defined at return air outlet 128, for example, airflow path 148 extends downward through passenger cabin 108 to facilitate limiting cross-circulation between passengers seated next to each other in a respective row 122 of aircraft 100. As used herein, "downward" refers to a one-way direction of travel that reduces in height between two points, such as from nozzles 146 to return air outlet 128, without the direction of travel increasing in height between the two points.

Figure 2:
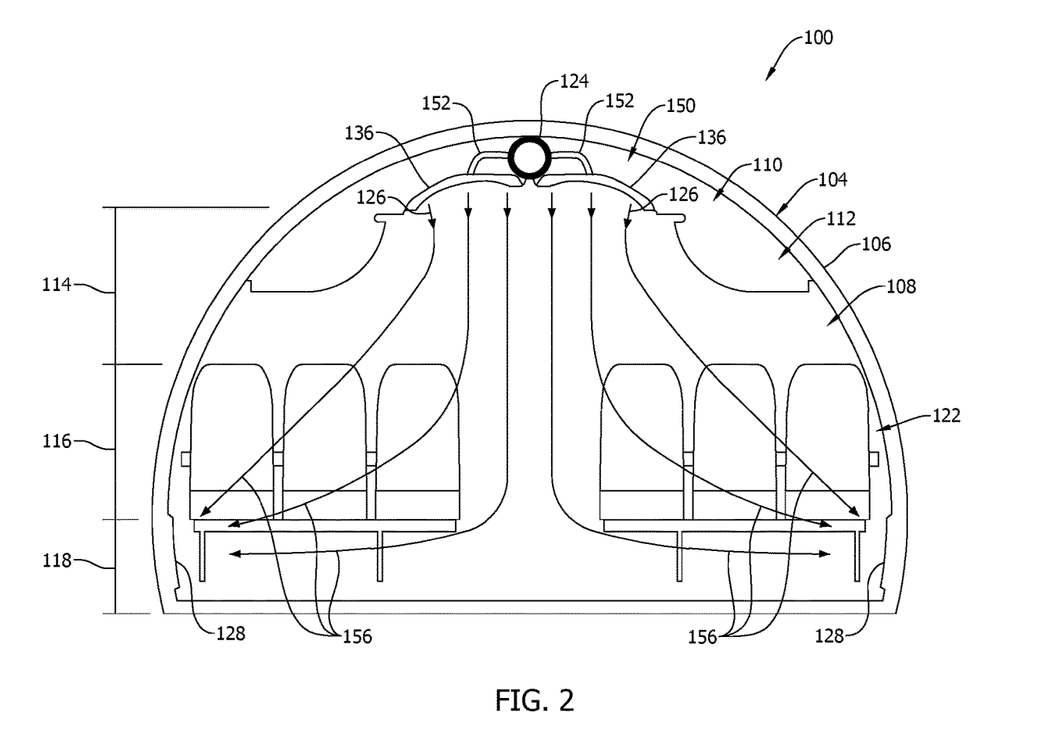
FIG. 2 is a cross-sectional view of an aircraft having an alternative air distribution system therein.

FIG. 2 is a cross-sectional view of aircraft 100 having an alternative air distribution system 150 therein. In the illustrated example, interior structure 112 includes a plurality of interior panels 136 extending between crown section 110 and passenger cabin 108. Interior panels 136 may be ceiling panels, side wall panels, overhead console panels, and the like, which are designed to be visible and aesthetically pleasing to the occupants of passenger cabin 108. Each interior panel 136 is coupled in flow communication with air supply duct 124. For example, a branched duct 152 may be coupled between air supply duct 124 and each interior panel 136 to enable conditioned air 126 to be channeled from air supply duct 124 to the plurality of interior panels 136. As will be described in more detail below, each interior panel 136 includes a plurality of perforations 154 (shown in FIG. 3) configured to discharge conditioned air 126 therefrom in a substantially downward direction relative to crown section 110.

As illustrated in FIG. 2, conditioned air 126 travels along an airflow path 156 that extends downward through overhead zone 114, downward through passenger zone 116, and then towards return air outlet 128 located in floor zone 118. Similar to airflow path 148, airflow path 156 extends downward through passenger cabin 108 to facilitate limiting cross-circulation between passengers seated next to each other in a respective row 122 of aircraft 100.

Figure 3:
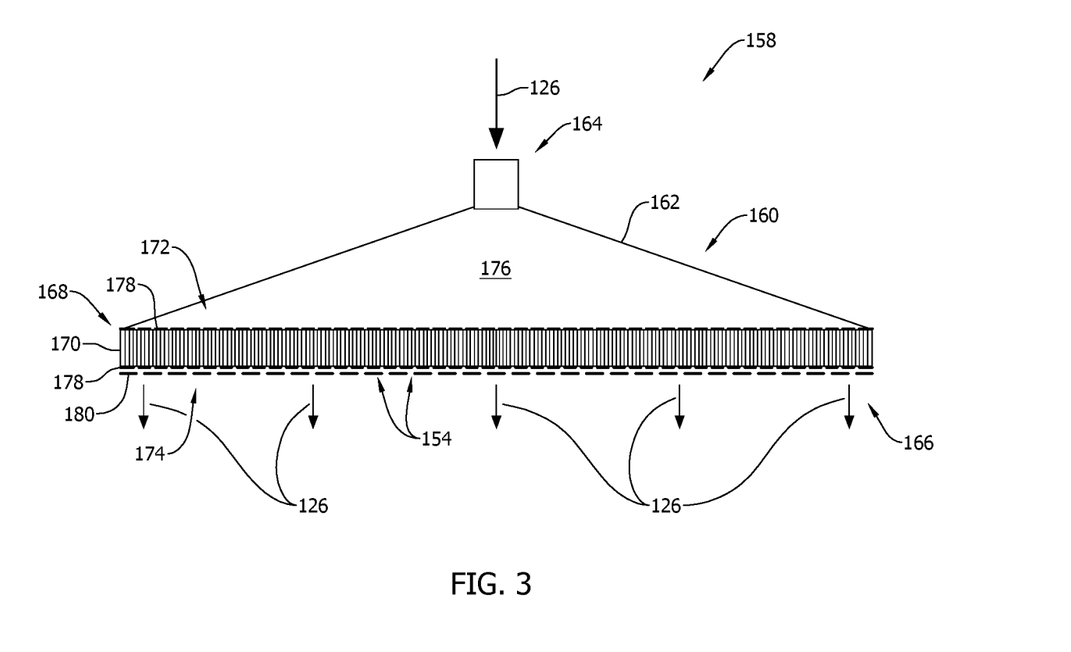
FIG. 3 is a cross-sectional view of an example interior panel that may be used in the air distribution system shown in FIG. 2.

FIG. 3 is a cross-sectional view of an example interior panel 158 that may be used in air distribution system 150 (shown in FIG. 2). In the illustrated example, each interior panel 158 includes a housing 160 having a side wall 162 defining an air inlet 164 and an air outlet 166. Air inlet 164 is coupled in flow communication with branched duct 152 (shown in FIG. 2) to enable conditioned air 126 to be channeled therethrough. Conditioned air 126 is channeled through housing 160 and then discharged from air outlet 166 directly into passenger cabin 108 (shown in FIG. 2).

Figure 4:
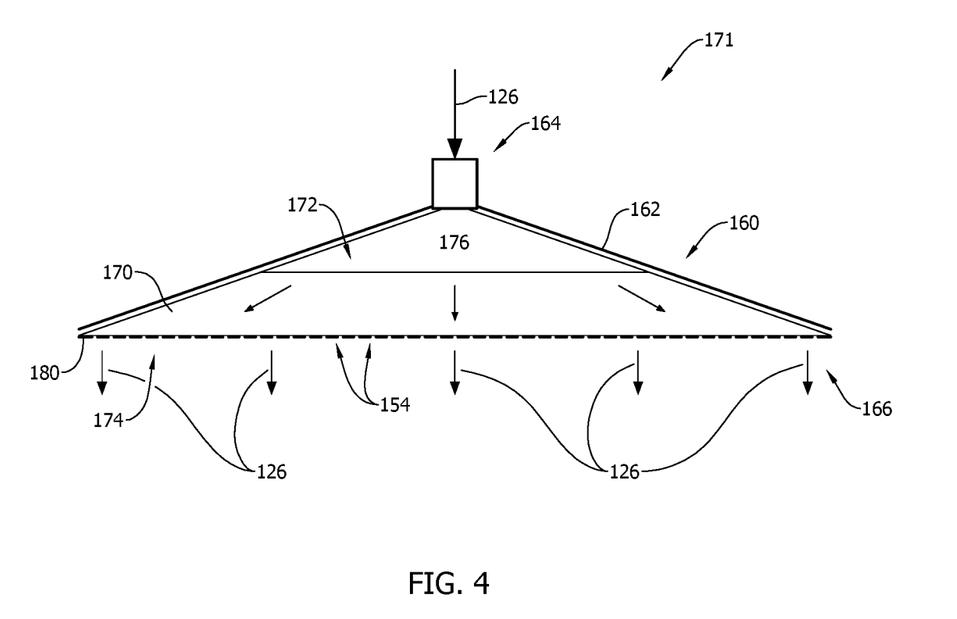
FIG. 4 is a cross-sectional view of an alternative interior panel that may be used in the air distribution system shown in FIG. 2.
Figure 5:
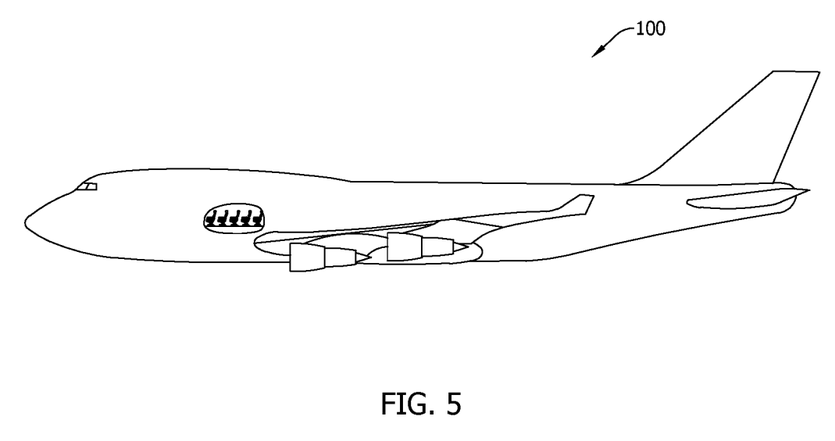
FIG. 5 is a side view of an example aircraft.

Interior panel 158 includes a nozzle 168 coupled to side wall 132 at air outlet 166. In the illustrated example, nozzle 168 includes a porous support structure 170, and at least one layer of material coupled thereto, as will be described in more detail below. Porous support structure 170 may be any flexible, semi-rigid, or rigid structure that enables airflow to be channeled therethrough. In the illustrated example, porous support structure 170 is in the form of a honeycomb structure having a plurality of hollow channels extending therethrough. Alternatively, as shown in FIG. 4, an interior panel 171 includes porous support structure 170 that is in the form of a porous foam material, such as polyvinyl chloride, polyetherimide, polyvinylidene fluoride, and the like.

Nozzle 168 has a first side 172 and a second side 174. Nozzle 168 extends across the entirety of air outlet 166 to define an air plenum 176 between air inlet 164 and first side 172 of nozzle 168. Perforations 154 are defined on second side 174 of nozzle 168. Extending nozzle 168 across air outlet 166 facilitates at least partially sealing housing 160, which enables air plenum 176 to be pressurized with conditioned air 126 channeled through air inlet 164. Accordingly, conditioned air 126 may be distributed across the entire surface area of first side 172. In one example, air inlet 164 is smaller in cross-sectional size than air outlet 166. Accordingly, side wall 162 of housing 160 may be tapered to increase in cross-sectional size from air inlet 164 to air outlet 166, which facilitates equalizing the pressure of conditioned air 126 across first side 172 of nozzle 168.

Referring again to FIG. 3, nozzle 168 further includes a layer 178 of porous material coupled on at least one of first side 172 or second side 174 thereof. The porous material may be any material that enables interior panel 158 to function as described herein. For example, the porous material may be a woven fibrous material, such as in a Leno weave pattern. The woven fibrous material may also be pre-impregnated with resin, adhesive, and the like (i.e., a "prepreg" composite). Accordingly, layer 178 extends across first side 172 and/or second side 174 to provide support to, and increase the rigidity of, porous support structure 170 while still permitting airflow therethrough.

In the illustrated example, nozzle 168 also includes a layer 180 of decorative porous material coupled over layer 178 of porous material on second side 174. Accordingly, layer 180 defines the exterior surface of interior panel 158 that is visible to occupants of passenger cabin 108 (shown in FIG. 2). Layer 180 provides an improved aesthetic appearance, relative to layer 178, that is suitable for visibility to occupants of passenger cabin 108. The decorative porous material may be any material that enables interior panel 158 to function as described herein. For example, layer 180 may be a thermoplastic sheet perforated by laser, chemical etching, abrasive blasting, contact with a drum roller with pins, or other suitable methods. Layer 180 may also be a cloth fabric material. Accordingly, interior panel 158 is provided with a plurality of perforations 154 on second side 174 thereof. In one example, perforations 154 are distributed generally substantially uniformly across layer 180 such that conditioned air 126 discharged therefrom is in the form of distributed bulk airflow. Thus, airflow is provided across the exposed surface area of layer 180.

In operation, conditioned air 126 is discharged from nozzles 146 and 168 at a flow rate greater than a first threshold, and at a velocity less than a second threshold, in order to satisfy a desired airflow recirculation rate through passenger cabin 108. The flow rate threshold is based at least partially on the number of occupants aircraft 100 is designed to transport. Accordingly, in one example, air distribution systems 102 and 150 are operable to discharge conditioned air from nozzles 146 and 168 at a flow rate greater than about 0.25 pounds per minute per occupant (lbs/min/occupant), greater than about 0.4 lbs/min/occupant, greater than about 0.5 lbs/min/occupant, or greater than about 0.55 lbs/min/occupant. The velocity threshold is based at least partially on a perceived comfort level of occupants of passenger cabin 108. Accordingly, in operation, air distribution systems 102 and 150 are operable to discharge conditioned air 126 from nozzles 146 and 168 into passenger cabin 108 at a velocity that is less than a threshold in which occupants of passenger cabin 108 may perceive an undesirable draft at their seat 120. Accordingly, air distribution systems 102 and 150 discharge conditioned air 126 at a velocity of less than about 500 feet per minute (ft/min), less than about 250 ft/min, less than about 100 ft/min, or less than about 50 ft/min.

The systems and methods described are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present invention or the "example embodiment" are not intended to be interpreted as excluding the existence of additional embodiments that also incorporate the recited features.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art after reading this specification. Such other examples are intended to be within the scope of the claims if they have structural elements that do not differ from the literal language of the claims, or if they include equivalent structural elements with insubstantial differences from the literal language of the claims.

What is claimed is:

1. An aircraft comprising:
    a fuselage comprising a side wall at least partially defining a passenger cabin and a crown section of the aircraft, wherein the passenger cabin includes an overhead zone, a passenger zone, and a floor zone;
    an air supply duct positioned within the crown section, the air supply duct comprising a side wall and a plurality of airflow openings defined in the side wall of the air supply duct and spaced along a length of the air supply duct, wherein the air supply duct is configured to pressurize the crown section with air;
    at least one return air outlet defined in the floor zone; and
    an interior structure coupled to the side wall of the fuselage and extending between the passenger cabin and the crown section, the interior structure comprising a plurality of nozzles oriented to discharge the air from the crown section along an airflow path that extends downward through the overhead zone, downward through the passenger zone, and then towards the at least one return air outlet, wherein a nozzle of the plurality of nozzles comprises a layer of porous material including a composite pre-impregnated with resin.

2. The aircraft in accordance with claim 1, wherein the interior structure comprises a plurality of components, at least some of the plurality of components being spaced from each other to define a gap therebetween that defines a respective nozzle of the plurality of nozzles.

3. The aircraft in accordance with claim 2, wherein the interior structure further comprises a visibility blocker extending across the gap, the visibility blocker configured to restrict visibility into the crown section from the passenger cabin.

4. The aircraft in accordance with claim 1, wherein the interior structure comprises at least one of an interior panel, a stowage bin, or an overhead console.

5. The aircraft in accordance with claim 1, wherein the interior structure is spaced from the side wall of the fuselage to define a gap therebetween, wherein the gap defines a respective nozzle of the plurality of nozzles.

6. The aircraft in accordance with claim 1, wherein the plurality of nozzles are configured to discharge the pressurized air at a velocity of less than about 50 feet per minute.

7. An aircraft comprising:
a fuselage comprising a side wall at least partially defining a passenger cabin and a crown section of the aircraft, wherein the passenger cabin includes an overhead zone, a passenger zone, and a floor zone;
an air supply duct positioned within the crown section, wherein the air supply duct is configured to channel air therethrough;
at least one return air outlet defined in the floor zone; and
a plurality of interior panels extending between the passenger cabin and the crown section, wherein each interior panel is coupled in flow communication with the air supply duct and wherein each interior panel comprises:
a housing comprising a side wall defining an air inlet and an air outlet;
a layer of porous material comprising a composite pre-impregnated with resin; and
a porous support structure formed from a honeycomb structure and coupled to the side wall of the housing at the air outlet,
wherein the plurality of interior panels each comprise a plurality of perforations defined in the porous support structure and configured to discharge the air therefrom along an airflow path that extends downward through the overhead zone, downward through the passenger zone, and then towards the at least one return air outlet.

8. The aircraft in accordance with claim 7, wherein an air plenum is defined between the air inlet and a first side of the porous support structure, and wherein the plurality of perforations are defined on a second side of the porous support structure.

9. The aircraft in accordance with claim 7, wherein the side wall of the housing is tapered to increase in cross-sectional size from the air inlet to the air outlet.

10. The aircraft in accordance with claim 8, further comprising a layer of decorative porous material coupled over the layer of porous material on the second side of the porous support structure.

11. The aircraft in accordance with claim 7 further comprising a branched duct coupled between the air supply duct and each interior panel.

12. The aircraft in accordance with claim 7, wherein the plurality of perforations are configured to discharge the air at a velocity of less than about 50 feet per minute.

13. An air distribution system comprising:
an air supply duct configured to channel air therethrough;
a plurality of interior panels each coupled in flow communication with the air supply duct, wherein the plurality of interior panels are coupled to each other in an array to define an interior structure, each interior panel comprising:
a housing comprising a side wall defining an air inlet and an air outlet;
a layer of porous material comprising a composite pre-impregnated with resin; and
a porous support structure formed from a honeycomb structure and coupled to the side wall at the air outlet, wherein an air plenum is defined between the air inlet and a first side of the porous support structure, and wherein a plurality of perforations configured to discharge the air therefrom are defined on a second side of the porous support structure.

14. The air distribution system in accordance with claim 13, wherein the side wall of the housing is tapered to increase in cross-sectional size from the air inlet to the air outlet.

15. The air distribution system in accordance with claim 13 further comprising a layer of decorative porous material coupled over the layer of porous material on the second side of the porous support structure.

16. The air distribution system in accordance with claim 13 further comprising a branched duct coupled between the air supply duct and the air inlet of each interior panel.

17. The air distribution system in accordance with claim 13, wherein the interior structure comprises a visibility blocker.

18. The air distribution system in accordance with claim 13, wherein the interior structure comprises at least one of an interior panel, a stowage bin, or an overhead console.

19. The air distribution system in accordance with claim 13, wherein the plurality of perforations are configured to discharge the air at a velocity of less than about 50 feet per minute.

20. The air distribution system in accordance with claim 13, wherein the layer of porous material is coupled on at least one of the first side or the second side of the porous support structure.

* * * * *